US012573043B1

(12) United States Patent  
Yap et al.

(10) Patent No.: US 12,573,043 B1  
(45) Date of Patent: Mar. 10, 2026

(54) VISUAL INSPECTION SYSTEM AND METHOD FOR LYOPHILIZED BEAD

(71) Applicant: Delta Electronics Int'l (Singapore) Pte Ltd, Singapore (SG)

(72) Inventors: Sally Shu Lin Yap, Singapore (SG); Bo Ma, Singapore (SG); Lei Zheng, Singapore (SG); Kai Wen Yeo, Singapore (SG); Jing Kai Leong, Singapore (SG); Hao-Min Ku, Tainan (TW)

(73) Assignee: Delta Electronics Int'l (Singapore) Pte Ltd, Singapore (SG)

( * ) Notice: Subject to any disclaimer, the term of this patent is extended or adjusted under 35 U.S.C. 154(b) by 0 days.

(21) Appl. No.: 18/962,186

(22) Filed: Nov. 27, 2024

(51) Int. Cl.
| | |
|---|---|
| *G06T 7/00* | (2017.01) |
| *G01N 15/14* | (2006.01) |
| *G01N 15/1433* | (2024.01) |
| *H04N 13/221* | (2018.01) |
| *H04N 23/56* | (2023.01) |

(52) U.S. Cl.
CPC ....... *G06T 7/0012* (2013.01); *G01N 15/1433* (2024.01); *G01N 15/1468* (2013.01); *H04N 13/221* (2018.05); *G06T 2200/04* (2013.01); *H04N 23/56* (2023.01)

(58) Field of Classification Search
None
See application file for complete search history.

(56) References Cited

U.S. PATENT DOCUMENTS

| | | | | |
|---|---|---|---|---|
| 2020/0333259 A1* | 10/2020 | Fouilloux | .............. | G01B 11/24 |
| 2021/0299879 A1* | 9/2021 | Pinter | .................... | B25J 9/1697 |
| 2022/0057336 A1* | 2/2022 | Pearson | ............. | G01N 21/9027 |
| 2024/0095983 A1* | 3/2024 | Goodwin | ................ | G06T 11/60 |
| 2024/0177288 A1* | 5/2024 | Senn | ..................... | G06T 7/0004 |

FOREIGN PATENT DOCUMENTS

| | | |
|---|---|---|
| CN | 205786396 U | 12/2016 |
| CN | 213068683 U | 4/2021 |
| CN | 213957187 U | 8/2021 |
| CN | 115855974 A | 3/2023 |
| WO | 9916010 A1 | 4/1999 |
| WO | 2023183542 A2 | 9/2023 |

\* cited by examiner

*Primary Examiner* — Chikaodili E Anyikire

(74) *Attorney, Agent, or Firm* — KIRTON McCONKIE; Evan R. Witt

(57) ABSTRACT

A visual inspection system includes a processor, a rotation stage, an adaptor, a light source, a telecentric lens and an image sensor. The adaptor is connected to the rotation stage and located under the rotation stage for positioning the lyophilized bead. The light source is located at a lateral side of the lyophilized bead for emitting lights to illuminate the lyophilized bead. The telecentric lens is located at the lateral side of the lyophilized bead for imaging the lyophilized bead. The image sensor is located at a lateral side of the telecentric lens opposite to the lyophilized bead for capturing images of the lyophilized bead. The rotation stage drives the lyophilized bead to rotate 360 degrees as performing an inspection of the lyophilized bead, and the image sensor continuously captures images of the lyophilized bead at different angles, thereby obtaining a three-dimensional image of the lyophilized bead for the inspection.

19 Claims, 4 Drawing Sheets

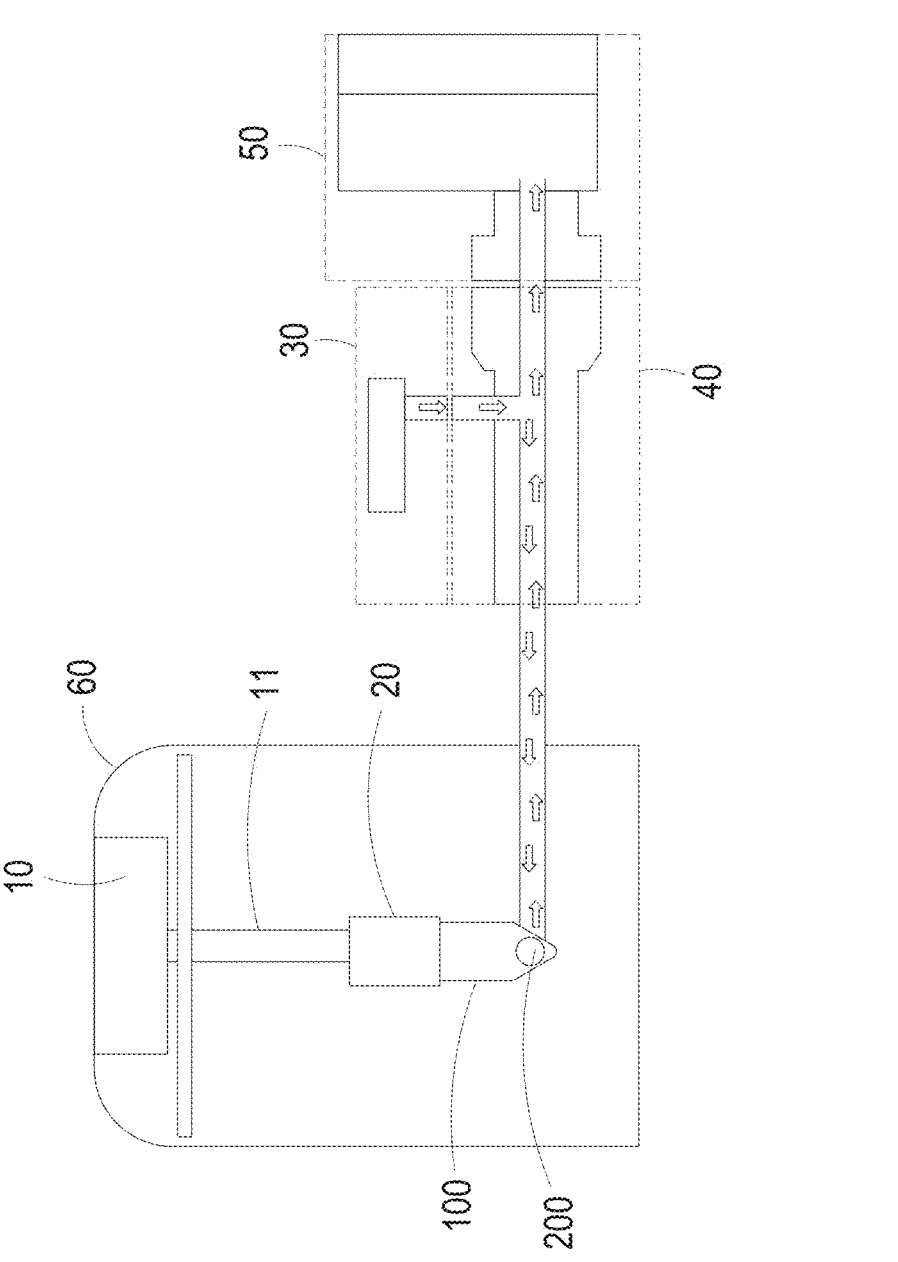
FIG. 1

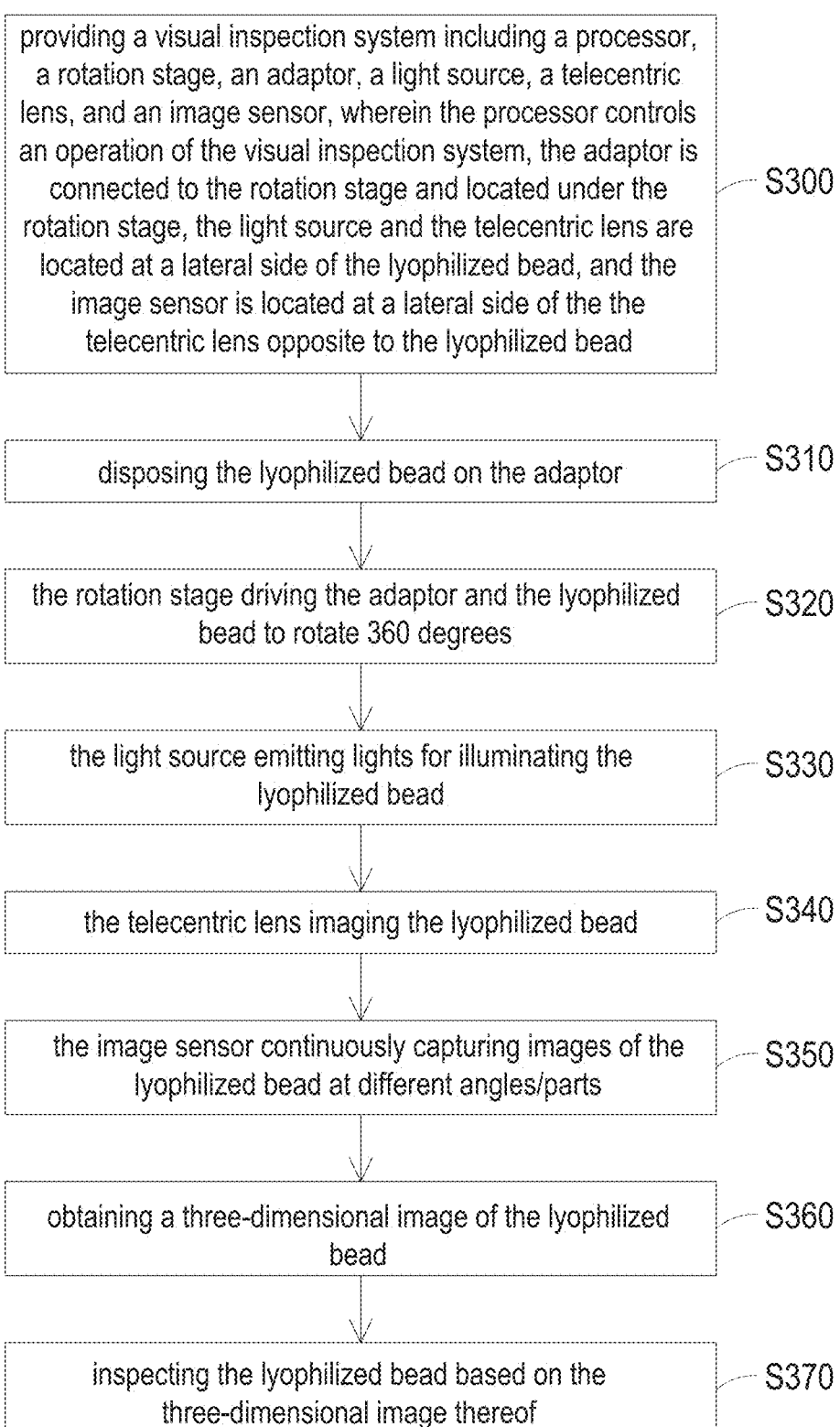

providing a visual inspection system including a processor, a rotation stage, an adaptor, a light source, a telecentric lens, and an image sensor, wherein the processor controls an operation of the visual inspection system, the adaptor is connected to the rotation stage and located under the rotation stage, the light source and the telecentric lens are located at a lateral side of the lyophilized bead, and the image sensor is located at a lateral side of the the telecentric lens opposite to the lyophilized bead — S300 disposing the lyophilized bead on the adaptor — S310 the rotation stage driving the adaptor and the lyophilized bead to rotate 360 degrees — S320 the light source emitting lights for illuminating the lyophilized bead — S330 the telecentric lens imaging the lyophilized bead — S340 the image sensor continuously capturing images of the lyophilized bead at different angles/parts — S350 obtaining a three-dimensional image of the lyophilized bead — S360 inspecting the lyophilized bead based on the three-dimensional image thereof — S370

FIG. 3

VISUAL INSPECTION SYSTEM AND METHOD FOR LYOPHILIZED BEAD

FIELD OF THE INVENTION

The present disclosure relates to a visual inspection system and method for lyophilized bead, and more particularly to a visual inspection system and method for lyophilized bead with improved efficiency.

BACKGROUND OF THE INVENTION

Lyophilized beads are commonly used for encapsulating reagents in PCR assays, microfluidics, drug or bacteria and are advantageous of longer shelf life, easy storage condition at room temperature, high surface area to volume ratio and low contamination risk.

As known, other than the mechanical properties, defects such as collapse, dents, cracks and abnormal shape of lyophilized beads also might influence functions thereof. Generally, the visual inspection for the outer appearance of lyophilized beads is conducted manually through human eyes with limitation, for example, human eyes can only detect particles up to 150 $\mu$m with 70% PoD (Probability of Detection). Also, manual inspection is inefficiency and high labor cost.

Therefore, there is a need of providing a visual inspection system and method for lyophilized bead capable of improving the drawbacks described above.

SUMMARY OF THE INVENTION

An object of the present disclosure is to provide a visual inspection system and method for lyophilized bead which is more efficient and cost-effective.

In accordance with an aspect of the present invention, a visual inspection system for a lyophilized bead is provided. The system includes a processor, a rotation stage, an adaptor, a light source, a telecentric lens and an image sensor. The processor controls an operation of the visual inspection system. The adaptor is connected to the rotation stage and located under the rotation stage for positioning the lyophilized bead. The light source is located at a lateral side of the lyophilized bead for emitting lights to illuminate the lyophilized bead. The telecentric lens is located at the lateral side of the lyophilized bead together with the light source for imaging the lyophilized bead. The image sensor is located at a lateral side of the telecentric lens opposite to the lyophilized bead for capturing images of the lyophilized bead. The rotation stage drives the lyophilized bead to rotate 360 degrees as performing an inspection of the lyophilized bead, and the image sensor continuously captures images of the lyophilized bead at different angles, thereby obtaining a three-dimensional image of the lyophilized bead for the inspection.

In accordance with another aspect of the present invention, a visual inspection method for a lyophilized bead is provided. The method includes providing a visual inspection system comprising a processor, a rotation stage, an adaptor, a light source, a telecentric lens, and an image sensor, wherein the processor controls an operation of the visual inspection system, the adaptor is connected to the rotation stage and located under the rotation stage, the light source and the telecentric lens are located at a lateral side of the lyophilized bead, and the image sensor is located at a lateral side of the the telecentric lens opposite to the lyophilized bead; disposing the lyophilized bead on the adaptor; the rotation stage driving the adaptor and the lyophilized bead to rotate 360 degrees; the light source emitting lights for illuminating the lyophilized bead; the telecentric lens imaging the lyophilized bead; the image sensor continuously capturing images of the lyophilized bead at different angles; obtaining a three-dimensional image of the lyophilized bead; and inspecting the lyophilized bead based on the three-dimensional image thereof.

The visual inspection system and method for lyophilized bead of the present disclosure employs the rotation stage to suspend and rotate the lyophilized bead for simplifying the configuration of the whole system and accordingly reducing the construction cost thereof, and at that same, the imaging efficiency of lyophilized bead and the accuracy of inspection are both improved.

BRIEF DESCRIPTION OF THE DRAWINGS

The above contents of the present disclosure will become more readily apparent to those ordinarily skilled in the art after reviewing the following detailed description and accompanying drawings, in which:

FIG. 1 is a schematic view showing a visual inspection system for lyophilized bead according to an embodiment of the present disclosure;

FIG. 3 is a flow chart illustrating a visual inspection method for lyophilized bead according to an embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
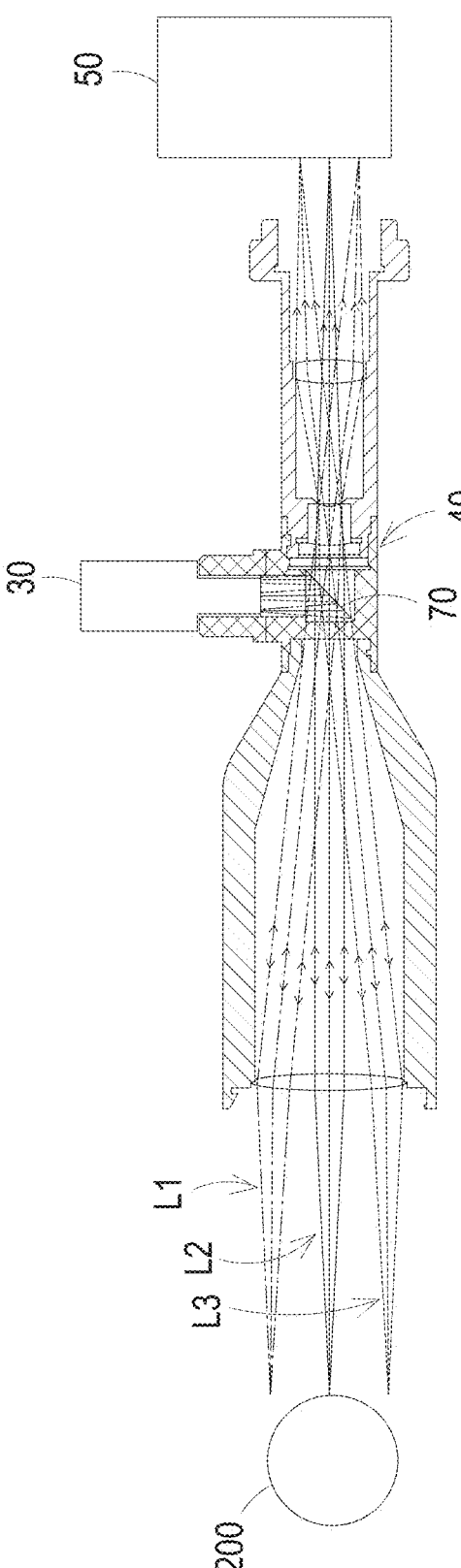
FIG. 2 is a schematic view showing the light paths in the visual inspection system according to the embodiment of the present disclosure.

Please refer to FIG. 1 and FIG. 2. FIG. 1 is a schematic view showing a visual inspection system for lyophilized bead according to an embodiment of the present disclosure, and FIG. 2 is a schematic view showing the light paths in the visual inspection system according to the embodiment of the present disclosure. A visual inspection system 1 for lyophilized bead includes a processor (not shown), a rotation stage 10, an adaptor 20, a light source 30, a telecentric lens 40 and an image sensor 50. The processor controls the operation of the visual inspection system. The rotation stage 10 is located in an inspection space, for example, the inspection space can be a housing, such as a light box 60, and the rotation stage 10 is mounted on the roof of the housing. The adaptor 20 is located at a position under the rotation stage 10 and connected to the rotation stage 10 through a connection element 11, such as a rigid rod. Alternatively, the adaptor 20 also can be formed to directly connect to the rotation stage 10, without limitation. A lyophilized bead 200 is accommodated in a container 100, such as a microfuge tube, and the container 100 is attached to the adaptor 20, so that the lyophilized bead 200 can be positioned under the rotation stage 10. In other words, the lyophilized bead 200 is suspended in the inspection space.

The visual inspection system 1 further includes a motor (not shown), such as a DC servo motor or a stepper motor, connected to the rotation stage 10, and the motor drives the rotation stage 10 to rotate surrounding a normal line of a disposition surface thereof, such as the roof of the housing, that is, the rotation stage 10 rotates 360 degrees along a surface parallel to the disposition surface. Accordingly, the container 100 and the lyophilized bead 200 accommodated therein can therefore being driven by the rotation stage 10 to rotate via the connection element 11 and the adaptor 20.

The light source 30 is employed to emit lights for illuminating the lyophilized bead 200 in the container 100 during the visual inspection. The light source 30 can be a white LED spot light for providing better illumination and contrast on the image of lyophilized bead 200. For example, the light source can be an in-line light source, a ring light source, a diffuse light source or other suitable light sources, without limitation. Notably, since the lights pass through the container 100 first and then illuminate on the lyophilized bead 200, it is preferable that the container is made of a transparent material for passing therethrough the lights. The telecentric lens 40 is employed to image the lyophilized bead 200. The telecentric lens 40 is advantageous of having a constant and non-angular FOV (fields of view), namely, the FOV of the telecentric lens 40 is always the same at any distance from the lens. Due to the rotation of lyophilized bead 200, it is predictable and reasonable that the lyophilized bead 200 will have slight displacements during the visual inspection, so that the telecentric lens 40 is employed to reduce the possible error induced by displacement. The image sensor 50 is employed to capture images of the lyophilized bead 200. In order to obtain the image of the lyophilized bead 200, which is a three-dimensional object, for visual inspection, it is necessary to capture images of multiple and different angles/parts of the lyophilized bead 200, so that the image sensor 50 is implemented to continuously capture images at a predetermined interval, thereby facilitating an image reconstruction of the three-dimensional image of the lyophilized bead 200. Preferably but not exclusively, the image sensor 50 can be a camera, such as a CCD base camera or a CMOS based camera or other digital imaging sensor-based camera, or can be other suitable image sensors, without limitation.

As shown, the light source 30, the telecentric lens 40 and the image sensor 50 are all arranged at the same lateral side of the lyophilized bead 200, and the light source 30 is located between the lyophilized bead 200 and the image sensor 50. The basis to support this configuration is that the lyophilized bead 200 is suspended under the rotation stage 10 and rotating during the visual inspection procedure. The lyophilized bead 200 is a three-dimensional object, and as known, without rotation, it will need to arrange multiple image sensors around the lyophilized bead 200 for completely capturing a full three-dimensional image of the surface thereof. Therefore, under the premise that the lyophilized bead 200 is suspended and rotating, different parts of the surface thereof will in turn face the same direction, so that the light source 30, the telecentric lens 40 and the image sensor 50 can be arranged at the same lateral side of the lyophilized bead 200, and also, the number of the image sensor 50 can be minimized.

There are several designs are adopted in the present disclosure for achieving this one side configuration. First, as shown in FIG. 2, a beam splitter 70 is employed, and lights emitted from the light source 30, as entering the telecentric lens 40, are split by the beam splitter 70 to change the direction thereof toward the lyophilized bead 200. Accordingly, the light source 30 can be located at a position outside the path between lyophilized bead 200 and the image sensor 50. In an embodiment, the light source 30 can be integrated with the telecentric lens 40, but not limited thereto. Moreover, the telecentric lens 40 is arranged at a substantially same horizontal height with the lyophilized bead 200, and as shown in FIG. 2, the light paths L1, L2, L3 from the telecentric lens 40 toward the lyophilized bead 200 which are substantially parallel to each other are substantially perpendicular to a rotation axis of the lyophilized bead 200. Therefore, the part of surface of the lyophilized bead 200 facing the telecentric lens 40 can be illuminated averagely to reduce blind spots. Furthermore, the image sensor 50 is located at a lateral side of the telecentric lens 40 opposite to the lyophilized bead 200, so as to receive the lights reflected by the lyophilized bead 200.

Accordingly, as compared with utilizing multiple static image sensors to capture images of static lyophilized bead, the present disclosure provides a simpler and more cost effective way, and the possible blind spots also can be reduced. Further, as compared with utilizing dynamic the image sensor(s) to capture images of static lyophilized bead, in which the movement of image sensor(s) is achieved by employing mechanical components, the present disclosure provides a simpler and more cost effective way, and the maintenance of system also becomes easier. Consequently, through the whole configuration described above, the present disclosure achieves a visual inspection system for lyophilized bead which can provide a complete image of lyophilized bead for automated inspection with reduced cost and improved efficiency.

Further refer to FIG. 3, the visual inspection method for lyophilized bead of the present disclosure is as follows. At step S300, an visual inspection system 1 as described above is provided, wherein the adaptor 20 is disposed under the rotation stage 10, which is capable of rotating 360 degrees, and the light source 30, the telecentric lens 40 and the image sensor 50 are located at the same lateral side of the lyophilized bead 200. At step S310, the lyophilized bead 200 is disposed on the adaptor 20 as so to suspend under the rotation stage 10. At step S320, the rotation stage 10 rotates, so as to drive the adaptor 20 and the lyophilized bead 200 to rotate 360 degrees. At step S330, the light source 30 emits lights for illuminating the lyophilized bead 200. At step S340, the telecentric lens 40 images the lyophilized bead 200. At step S350, the image sensor 50 continuously captures images of the lyophilized bead 200 at different angles/parts. At step S360, a three-dimensional image of the lyophilized bead is obtained. At step S370, the lyophilized bead 200 is inspected based on the three-dimensional image thereof.

In an embodiment, for processing and analyzing the images of lyophilized bead 200 captured by the image sensor 50 for further defect inspection, the visual inspection system 1 further includes an image processing module (not shown) and an identification module (not shown). The image processing module is controlled by the processor to reconstruct the three-dimensional image of the lyophilized bead 200 from the images of the lyophilized bead 200 at different angles/parts captured by the image sensor 50. The identification module is controlled by the processor to identify defects on the surface of the lyophilized bead 200 based on the reconstructed three-dimensional image of the lyophilized bead 200. For example, software can be employed to perform image processing and analysis and defect identification. During image processing, the position and size of the lyophilized bead 200 will be identified, and the background of the lyophilized bead 200 will be cropped leaving only the lyophilized bead 200 for further image analysis. In an embodiment, the inspection space, such as the light box 60, can be implemented to provide a white ambient light for facilitating the image processing and analysis process and the defect identification process.

Since the lyophilized bead 200 is accommodated in the container 100 and rotated during inspection, the orientation of each inspected lyophilized bead 200 may be different. Therefore, in order to optimize the reconstructed image and also improve the accuracy of defect inspection, the reconstruction of three-dimensional image of the lyophilized bead 200 is correlated to an orientation thereof. In addition, the images captured by the image sensor 50 are further analyzed for adjusting a rotation speed of the rotation stage 10, so as to prevent improper rotation speed from influencing the orientation of the lyophilized bead and also the image reconstruction thereof.

Figure 4A:
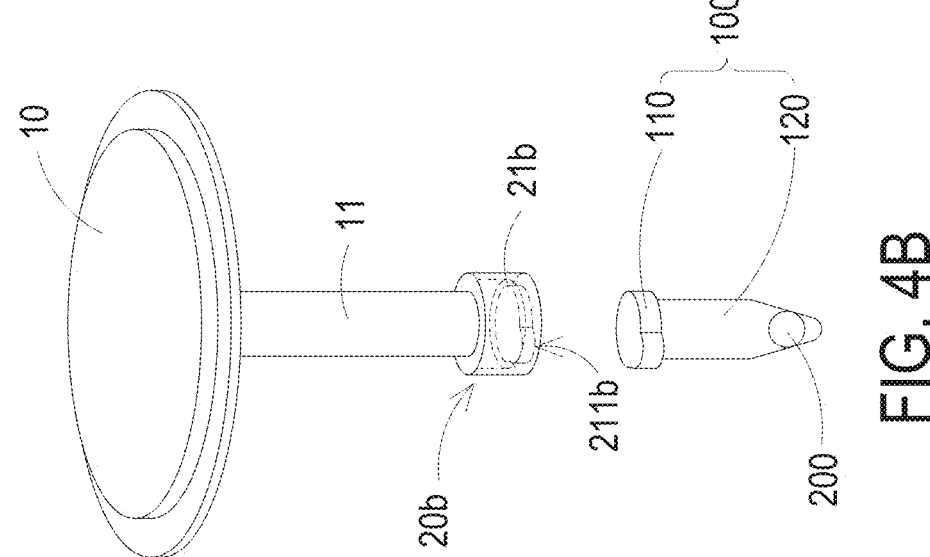
FIG. 4A is a schematic view showing the combination of an adaptor and a container having the lyophilized bead accommodated therein according to an embodiment of the present disclosure.
Figure 4B:
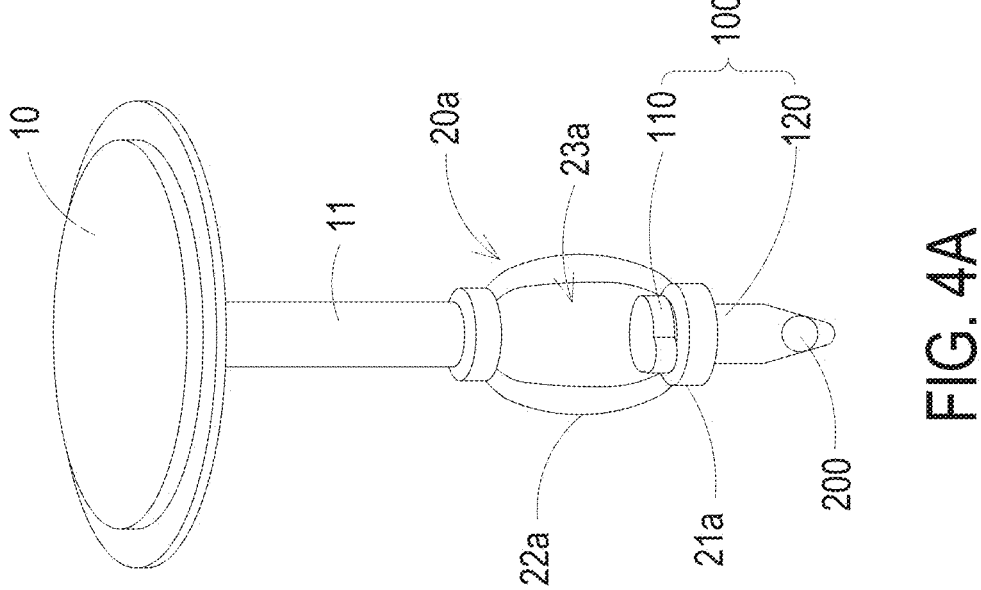
FIG. 4B is a schematic view showing the combination of an adaptor and a container having the lyophilized bead accommodated therein according to another embodiment of the present disclosure.

The structure of the adaptor can be implemented to be different for engaging with the container 100 in accordance with the practical situations. Please refer to FIG. 4A and FIG. 4B. FIG. 4A is a schematic view showing the combination of an adaptor and a container having the lyophilized bead accommodated therein according to an embodiment of the present disclosure, and FIG. 4B is a schematic view showing the combination of an adaptor and a container having the lyophilized bead accommodated therein according to another embodiment of the present disclosure. The container 100 includes a cover portion 110 and a body portion 120. The body portion 120 is used to accommodate the lyophilized bead 200 therein, and the cover portion 110 is used to enclose the body portion 120 and separate the lyophilized bead 200 from the environment.

In an embodiment, as shown in FIG. 4A, an adaptor 20a includes a surrounding portion 21a and a plurality of connection portions 22a. The surrounding portion 21a is connected to the connection element 11 through the connection portions 22a, so as to form a hollow space 23a between the connection element 11 and the surrounding portion 21a. The surrounding portion 21a is formed to have a passage therein, so that the body portion 120 of the container 100 can be disposed within the passage of the surrounding portion 21a through passing through the hollow space 23a, and the cover portion 110 can be rested on the surrounding portion 21a, thereby suspending the lyophilized bead 200 under the rotation stage 10. More specifically, the size of the passage of the surrounding portion 21a is designed to be larger than the body portion 120 and smaller than the cover portion 110, so that only the body portion 120 can be inserted in the passage of the surrounding portion 21a, and the cover portion 22a will be blocked. Accordingly, the surrounding portion 21a will surround a periphery of the body portion 120 and support the cover portion 110, so as to stabilize the container 100 during inspection. Preferably but not exclusively, the shapes of the body portion 120 and the surrounding portion 21a are matched to each other, such as in a tight fitted state, so as to achieve a better stabilization of the container 100 during rotation. In an embodiment, the surrounding portion 21a can be implemented as a ring or a loop for surrounding the body portion 120, which generally has a cylindrical shape, but not limited thereto. In an embodiment, the number and the length of the connecting portions 22a both can be varied in accordance with the practical requirements, for example, the number can be two, three or four, and the length thereof can be adjusted in accordance with the length of the container 100, without limitation.

In another embodiment, as shown in FIG. 4B, an adaptor 20b includes an engaging portion 21b with an opening 211b. The engaging portion 21b is engaged with the cover portion 110 of the container 100 so as to stabilize thereof. The engaging portion 21b is formed to have a shape matched with the shape of the cover portion 110, so that the cover portion 110 can embed in through the opening 211b and engage therewith, thereby suspending the lyophilized bead 200 under the rotation stage 10. For example, the opening 211b can be implemented to locate at the bottom of the engaging portion 21b, and the cover portion 110 can be embedded therein through pushing up and rotating to secure. In other embodiments, different engaging manners between the container 100 and the engaging portion 21b also can be employed. For example, the opening can be implemented to locate at the lateral side of the engaging portion, and the cover portion is embedded in through sliding. Therefore, there is no limitation. Alternatively, other than engaging with the cover portion 110, the adapter 20b also can be implemented to engage with other portion of the container 100 only if the light paths on the lyophilized bead 200 are not blocked thereby, without limitation. In this embodiment, the embedding engagement adopted between the container 100 and the adaptor 20b is beneficial to achieve a higher rotation speed of the container 100 without significantly influencing the orientation of the lyophilized bead 200 during inspection.

Through the design of the adaptor 20, 20a, 20b, the container 10 having the lyophilized bead 200 accommodated therein is mainly fixed at the cover portion 110. Since the lyophilized bead 200 is at the bottom of the container 10 and the container 10 is made of transparent material, the blind spot as capturing the images of the lyophilized bead 200 can be minimized, which is especially beneficial to image reconstruction and defect inspection of the lyophilized bead 200.

In conclusion, in the visual inspection system and method for lyophilized bead of the present disclosure, through suspending and rotating the lyophilized bead, the light source, the telecentric lens and the image sensor can be arranged at the same lateral side of the lyophilized bead, so that not only the number of image sensor can be minimized, but also the imaging of the lyophilized bead can be achieved in a more cost effective way with improved efficiency. Furthermore, through the design of the adaptor in the system for disposing the container, other than the container can be maintained at a stable state during rotation, the blind spots as capturing images of the lyophilized bead accommodated therein also can be reduced, thereby facilitating the performing of automated inspection.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A visual inspection system for a lyophilized bead, comprising:

a processor controlling an operation of the visual inspection system;

a rotation stage;

an adaptor connected to the rotation stage and located under the rotation stage for positioning the lyophilized bead;

a light source located at a lateral side of the lyophilized bead for emitting lights to illuminate the lyophilized bead;

a telecentric lens located at the lateral side of the lyophilized bead together with the light source for imaging the lyophilized bead;

an image sensor located at a lateral side of the telecentric lens opposite to the lyophilized bead for capturing images of the lyophilized bead, wherein the rotation stage drives the lyophilized bead to rotate 360 degrees as performing an inspection of the lyophilized bead, and the image sensor continuously captures images of the lyophilized bead at different angles, thereby obtaining a three-dimensional image of the lyophilized bead for the inspection;

an image processing module controlled by the processor for reconstructing the three-dimensional image of the lyophilized bead from the images of the lyophilized bead at different angles captured by the image sensor; and an identification module controlled by the processor for identifying defects on a surface of the lyophilized bead based on a reconstructed three-dimensional image of the lyophilized bead.

2. The visual inspection system as claimed in claim 1, wherein the reconstructing of the three-dimensional image of the lyophilized bead is correlated to an orientation of the lyophilized bead.

3. The visual inspection system as claimed in claim 1, wherein the images captured by the image sensor are further analyzed for adjusting a rotation speed of the rotation stage.

4. The visual inspection system as claimed in claim 1, wherein the telecentric lens and the lyophilized bead are located at a substantially same horizontal height.

5. The visual inspection system as claimed in claim 1, further comprising a housing for positioning the rotation stage, wherein the lyophilized bead is inspected within the housing.

6. The visual inspection system as claimed in claim 5, wherein the housing is a light box for further providing ambient lights during the inspection.

7. The visual inspection system as claimed in claim 1, wherein the lyophilized bead is accommodated in a container and the container is disposed on the adaptor.

8. The visual inspection system as claimed in claim 7, wherein the adaptor comprises a surrounding portion for surrounding a periphery of the container.

9. The visual inspection system as claimed in claim 7, wherein the adaptor comprises an engagement portion for engaging with a portion of the container.

10. The visual inspection system as claimed in claim 7, wherein the container is made of a transparent material for passing therethrough the lights illuminated by the light source.

11. The visual inspection system as claimed in claim 1, wherein the rotation stage is driven by a motor.

12. The visual inspection system as claimed in claim 1, wherein the light source is one selected from a group consisting of an in-line light source, a ring light source and a diffuse light source.

13. The visual inspection system as claimed in claim 1, wherein the image sensor comprises a camera.

14. A visual inspection method for a lyophilized bead, comprising:

providing a visual inspection system comprising a processor, a rotation stage, an adaptor, a light source, a telecentric lens, and an image sensor, wherein the processor controls an operation of the visual inspection system, the adaptor is connected to the rotation stage and located under the rotation stage, the light source and the telecentric lens are located at a lateral side of the lyophilized bead, and the image sensor is located at a lateral side of the the telecentric lens opposite to the lyophilized bead;

disposing the lyophilized bead on the adaptor;

the rotation stage driving the adaptor and the lyophilized bead to rotate 360 degrees;

the light source emitting lights for illuminating the lyophilized bead;

the telecentric lens imaging the lyophilized bead;

the image sensor continuously capturing images of the lyophilized bead at different angles;

obtaining a three-dimensional image of the lyophilized bead; and inspecting the lyophilized bead based on the three-dimensional image thereof.

15. The visual inspection method as claimed in claim 14, further comprising:

reconstructing the three-dimensional image of the lyophilized bead by an image processing module from the images of the lyophilized bead at different angles captured by the image sensor; and identifying defects on a surface of the lyophilized bead by an identification module based on a reconstructed three-dimensional image of the lyophilized bead.

16. The visual inspection method as claimed in claim 15, wherein the reconstructing of the three-dimensional image of the lyophilized bead is correlated to an orientation of the lyophilized bead.

17. The visual inspection method as claimed in claim 14, further comprising analyzing the images captured by the image sensor for adjusting a rotation speed of the rotation stage.

18. The visual inspection method as claimed in claim 14, wherein the telecentric lens and the lyophilized bead are located at a substantially same horizontal height.

19. The visual inspection method as claimed in claim 14, wherein the lyophilized bead is accommodated in a container and the container is disposed on the adaptor.

* * * * *